United States Patent [19]

Yao et al.

[11] Patent Number: 4,573,873

[45] Date of Patent: Mar. 4, 1986

[54] COLLECTIVE AND CYCLIC IN-MAST PITCH CONTROL SYSTEM FOR A HELICOPTER

[75] Inventors: Samuel S. Yao, Fountain Valley; Samuel K. F. Chu, Harbor City, both of Calif.

[73] Assignee: Hughes Helicopters, Inc., Culver City, Calif.

[21] Appl. No.: 457,695

[22] Filed: Jan. 13, 1983

[51] Int. Cl.$^4$ ............................................. B64C 27/74
[52] U.S. Cl. .................................. 416/114; 416/116
[58] Field of Search ............... 416/114, 115, 113, 116, 416/98, 112

[56] References Cited

U.S. PATENT DOCUMENTS

| | | | |
|---|---|---|---|
| 2,088,413 | 7/1937 | Hafner | 416/98 |
| 2,232,289 | 2/1941 | Upson | 416/113 |
| 2,579,860 | 12/1951 | Pullin et al. | 416/114 |
| 2,651,480 | 9/1953 | Pullin | 416/130 X |
| 3,080,002 | 3/1963 | DuPont | 416/114 X |
| 3,321,022 | 5/1967 | Oguri | 416/112 |
| 3,572,616 | 3/1971 | Ulisnik | 416/98 |
| 3,574,483 | 4/1971 | Linden | 416/115 X |
| 3,578,875 | 5/1971 | Oguri | 416/114 X |

FOREIGN PATENT DOCUMENTS 531608  1/1941  United Kingdom ................ 416/114

*Primary Examiner*—Everette A. Powell, Jr.

*Attorney, Agent, or Firm*—Beehler, Pavitt, Siegemund, Jagger & Martella

[57] ABSTRACT

A compact, rugged, streamline, stiff, pitch control system is devised in a helicopter by concentrically nesting a cyclic pitch control tube and collective pitch control tube within the drive shaft and stationary mast of a helicopter rotor system. The collective pitch control tube terminates in an upper inclined flange which engages a stationary swashplate by means of a bearing member disposed in an inclined bearing raceway in the stationary swashplate. The stationary swashplate in turn is rotatably coupled through a universal joint to the cyclic pitch control tube. Relative rotation of the cyclic pitch control tube with respect to the collective pitch control tube adjusts the stationary swashplate to a selected inclination with respect to the longitudinal axis of the control tubes and of the helicopter mast. A rotating swashplate is rotatably coupled to the stationary swashplate and transmits the angular orientation of the stationary swashplate to the pitch case of each rotor blade as appropriate. The cyclic pitch control tube and collective pitch control tube are rotatably coupled to each other to permit relative angular rotation, but otherwise can be displaced vertically in the direction of the mast as a collective unit, thereby vertically displacing the stationary swashplate and hence the rotating swashplate to effect collective pitch control for all of the blades of the rotor system.

14 Claims, 5 Drawing Figures

COLLECTIVE AND CYCLIC IN-MAST PITCH CONTROL SYSTEM FOR A HELICOPTER

BACKGROUND OF THE INVENTION

1. Field of the Invention

The present invention relates to the field of helicopter control mechanisms and more particularly relates to rotor blade pitch control mechanisms.

2. Description of the Prior Art

The prior art control systems for the cyclic and collective pitch of helicopter blades, typically involve a series of linkages and control rods for transmitting a force or displacement to the rotor blade pitch control horns to collectively control the pitch of all the blades or individually of any one blade.

Consider for example, the prior art system shown in FIG. 1 and briefly described here. FIG. 1 shows in diagramatic and simplified view the control linkages for a two blade rotor system depicted in a simplified form in isolation of all other elements of the helicopter. Blades 10 are controlled through conventional rotor blade pitch control horns 12, which when angularly displaced, will rotate blades 10 and thus alter the pitch of each corresponding blade. Each pitch control horn 12 is connected to an adjustable upper link 14 which is coupled at its opposing end to a corresponding rotating rocker arm 16. Rotating rocker arm 16 pivots about an axis perpendicular to the longitudinal axis of drive shaft 18. The opposing end of each rotating rocker arm 16 is then coupled to an adjustable lower link 20 which in turn is connected to an upper swashplate which is rotatable and tiltable with respect to the longitudinal axis of drive shaft 18. Upper swashplate 22 rides on a lower swashplate 24 which is mounted on gimbles and is allowed to tilt, but cannot rotate or move vertically. Lower swashplate 24 is controlled by connection through stationary and fixed linkage rods 26 to a control stick 28. Control stick 28 is movable in any direction and thus can impart through linkage rods 26 an arbitrarily selected inclination to fixed, nonrotatable lower swashplate 24.

Thus, control is effected by appropriately positioning control stick 28 to determine a fixed angular orientation for lower swashplate 24 which in turn is then transmitted to rotating upper swashplate 22 through lower links 20, to rocker arms 16, and then through upper links 14 to pitch control horns 12. By this means, the position of control stick 28 individually adjusts the pitch of each blade 10 of the helicopter rotor system consistent with the constraints and relationships imposed upon each of the blades by virtue of their common coupling through upper and lower swashplates 22 and 24.

The pilot also has a collective pitch lever 30 which is similarly connected through a linkage system, generally denoted by a reference numeral 32, to a collective pitch sleeve, vertical positioning mechanism 34 slidably connected to a collective pitch sleeve 36. Collective pitch sleeve 36 rotates in synchronism with drive shaft 18 and is vertically disposable thereon in parallel to the longitudinal axis of drive shaft 18. Thus, as collective pitch sleeve 36 is raised or lowered by movement of collective pitch sleeve vertical positioning mechanism 34, rotating rocker arms 16 are also moved vertically along the longitudinal axis of drive shaft 18 to collectively displace each of the corresponding pitch control horns 12 by an equal amount.

Such typical prior art systems are characterized by a number of substantial drawbacks. Firstly, the number of parts, connections, linkages and adjustments which are included within the pitch control system, even when illustrated in a highly simplified diagramatic view such as shown in FIG. 1, is large.

Secondly, a reactive force is applied to blades 10 whenever the pitch is changed and is maintained thereon thereby tending to return blades 10 to zero pitch. This reactive force is transmitted through pitch control horns 12 and the linkage system of FIG. 1 and is felt at a pilot's control pitch lever 30 and control stick 28 as a reverse feedback control force and motion.

Thirdly, all of the control elements as illustrated in FIG. 1 are clearly exterior to drive shaft 18. These elements rotate with shaft 18 thereby contributing substantial air drag not only when the helicopter is in flight as a whole, but when hovering as well.

Fourthly, complex and multiple linkages such as shown in typical prior art systems of FIG. 1 are prone to cumulative error or control lag and looseness such that a small movement in the pilot's control stick 28 or pitch lever 30 does not precisely result in any equal amount of displacement in the desired direction in pitch control horns 12. The result is that the control systems of the prior art have a loose feel, tend to be inaccurate in response and variable between one helicopter and the next, even when of identical design, due to small assembly differences and differences in wear.

Finally, such prior art systems are highly vulnerable to damage, particularly in military rotorcraft where even slight damage to any portion of the control linkage can materially interfere with control or result in a stress failure.

Therefore, what is needed is a control system which reduces the number of parts and connections thereby increasing the reliability and lessening the probability of mechanical breakdown, and which system provides an accurate, stiff, precise blade control system, with reduced air drag in the rotor system and which insulates the pilot's controls from feedback motion and feedback control forces.

BRIEF SUMMARY OF THE INVENTION

The present invention is an apparatus for controlling a rotary blade system in a helicopter having a fuselage wherein the rotary blade system includes a plurality of controllable rotor blades. The apparatus comprises a stationary mast extending from the fuselage of the helicopter and characterized by a longitudinal axis.

A collective pitch control tube is then disposed within the stationary mast concentrically about the longitudinal axis. The collective pitch control tube has an upper flange which defines a first plane inclined at an angle with respect to the longitudinal axis.

A cyclic pitch control tube is also disposed within the stationary mast concentrically with the longitudinal axis. The cyclic pitch control tube has an adjustable swashplate rotatably coupled thereto. The adjustable swashplate is also rotatably coupled to the upper flange of the collective pitch control tube. The adjustable swashplate and the cyclic pitch control tube rotate with respect to the collective pitch control tube as a unit. Thus, the adjustable swashplate will rotate with respect to the upper flange of the collective pitch control tube. The inclination of the adjustable swashplate with respect to the longitudinal axis is thus determined by the relative angular position of the adjustable swashplate with respect to the inclined upper flange of the collective pitch control tube. A bearing race is provided for rotatably coupling the adjustable swashplate to the upper flange of the collective pitch control tube. The bearing race is disposed in the swashplate in a second plane which is also inclined with respect to the longitudinal axis. Thus, where the inclination of the bearing raceway is substantially the same as the inclination of the upper flange with respect to the longitudinal axis, the raceway and adjustable swashplate can be rotated with respect to the upper flange so that the inclination of the bearing raceway and the upper flange in effect cancel out thereby leaving the adjustable swashplate in a level position which is substantially perpendicular to the longitudinal axis. At any other relative angular displacement between the upper flange and the adjustable swashplate, the adjustable swashplate will be left at a selected angular inclination with respect to the longitudinal axis.

The apparatus also includes a drive shaft disposed within the stationary mast and connected to the plurality rotor blades for imparting rotary motion to the rotor blades when the drive shaft is rotated.

Finally, a pitch linkage mechanism couples the adjustable swashplate to the plurality of rotor blades wherein the pitch linkage mechanism is connected to the plurality of rotor blades to control their pitch and wherein the pitch linkage mechanism is also coupled to the adjustable swashplate so that the inclination of the adjustable swashplate with respect to the longitudinal axis causes the pitch of the rotor blades to be changed.

By reason of this combination of elements a rigid and accurate control of the rotor blades is obtained without feedback of reversible control forces being substantially transmitted through the control mechanism. Moreover, more accurate blade control is achieved, the number of parts and connections used in the control mechanism is reduced resulting in an increased reliability and simpler maintenance. In addition, air drag is substantially reduced due to the higher compactness of the entire apparatus.

These and other embodiments of the present invention are best understood by reviewing the following Figures wherein like elements are referenced by like numerals.

BRIEF DESCRIPTION OF THE DRAWINGS

FIG. 3 is a sectional view of an upper portion of FIG. 2.

FIG. 4 is a simplified and diagramatic partial perspective view in enlarged scale of one means of controlling the relative displacement of the collective pitch control tube and cyclic pitch control tube of the present invention.

FIG. 5 is a bottom plan view in enlarged scale an alternative embodiment for controlling relative angular displacement of the collective pitch control tube and cyclic pitch control tube of the present invention.

The present invention and its various embodiments are better understood by viewing the following Figures in light of the following Detailed Description of the Preferred Embodiments.

DETAILED DESCRIPTION OF THE PREFERRED EMBODIMENTS

The present invention is an in-mast mounted cyclic and collective pitch control system in a helicopter. The control elements are provided by relatively stiff tubes which are concentrically disposed one within each other and aligned with the longitudinal axis of the stationary mast of the helicopter. A collective pitch control tube terminates in a tilted upper flange which mates in a similarly tilted circumferential ball bearing race provided in an adjustable swashplate which in turn is rotatably connected to a cyclic pitch control tube. Relative rotation of the collective pitch control tube with respect to the cyclic pitch control tube causes the angular orientation of the adjustable swashplate, which is connected to the cyclic pitch control tube, to assume different attitudes with respect to the substantially common longitudinal axis of the control tubes. This controllable inclination is then used to control the cyclic pitch of the rotor blades. The collective pitch control tube is displaceable in a vertical direction parallel to the longitudinal axis of the control tubes to provide collective pitch control.

Figure 2:
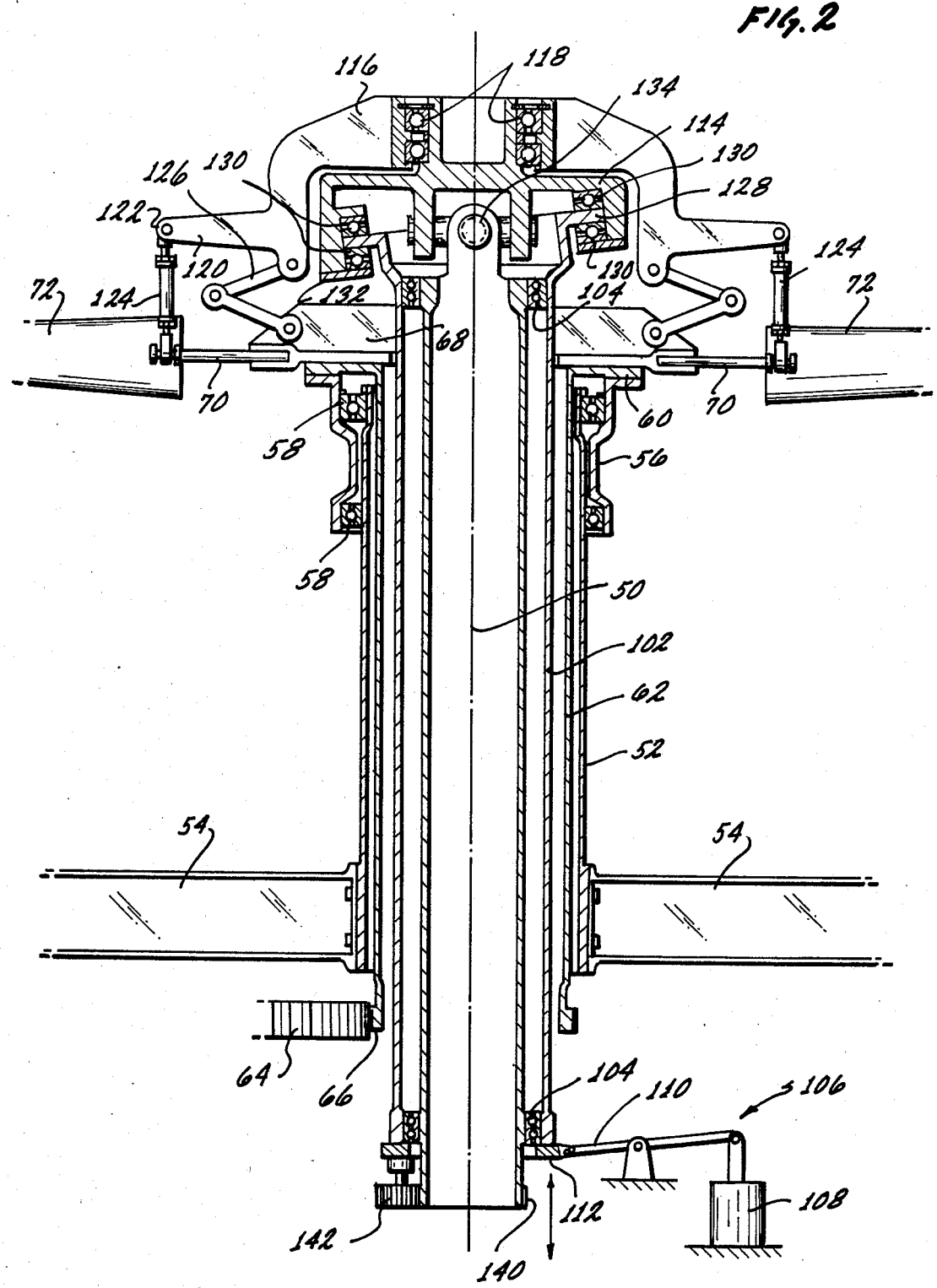
FIG. 2 is a sectional view taken through the longitudinal axis of the stationary mast of the helicopter according to the present invention.

The present invention and it various embodiments are best understood by now referring to FIG. 2 which shows a cross section taken through the longitudinal axis 50 of the stationary mast 52 of a helicopter (not shown). Stationary mast 52 is connected in a conventional manner to the airframe or fuselage 54 of the helicopter and extends upwardly to provide the structural connection with the rotor blade system which is only partially shown in FIG. 2. More particularly, stationary mast 52 is rotatably coupled to a main bearing housing 56 which is journaled about stationary mast 52 by means of circumferential ball bearing races 58. Ball bearing races 58 are of conventional design and function to retain main bearing housing 56 securely to mast 52 even under large lift loads developed by the rotor system. Main bearing housing 56 is fixed by welding, bolting or both, or other conventional means to a perpendicular terminating flange 60 of drive shaft 62. Drive shaft 62 extends downwardly in substantially concentric alignment with longitudinal axis 50 and terminates in a transmission which is diagramatically shown as gear 64 engaging a mating gear 66 provided at the end of drive shaft 62. In any case, drive shaft 62 is rotatable about longitudinal axis 50 and vertically fixed with respect thereto.

Upper flange 60 of drive shaft 62 is fixed to a rotating hub plate 68 which in turn is coupled through a conventional flexure 70 to a pitch case 72 for each rotor blade. As in conventional designs, pitch case 72 is connected to a corresponding rotor blade (not shown) and includes a conventional pitch control horn by which the pitch of pitch case 72 and ultimately its corresponding rotor blade, is controlled.

The elements of the present invention shown thus far are conventional and thus have not been detailed beyond that necessary to provide a clear background for a complete understanding of the environment of the present invention.

Consider now the pitch control elements of the present invention starting with cyclic pitch control tube 100 and collective pitch control tube 102. Cyclic pitch control tube 100 is disposed within stationary mast 52 and is concentric with longitudinal axis 50. Disposed outside of cyclic pitch control tube 100 is collective pitch control tube 102 which is disposed within drive shaft 66 and stationary mast 52. Thus, beginning from longitudinal axis 50, cyclic pitch control tube 100, collective pitch control tube 102, drive shaft 66, and stationary mast 52 form a nested series of concentric tubes each substantially centered and aligned with longitudinal axis 50 in the order recited. Thus, the only shaft or tube exposed to the outside is stationary mast 52. What results is a highly compact control and drive system totally contained within a single aerodynamic, stationary housing. Thus, the amount of air drag which arises from rotational motion of the control elements can be minimized and controlled. Damage vulnerability is also decreased.

Cyclic pitch control tube 100 and collective pitch control tube 102 are rotatable with respect to each other and with respect to drive shaft 66 and stationary mast 52. In particular, cyclic pitch control tube 100 and collective pitch control tube 102 are coupled to each other through a pair of circumferential ball bearing races 104 provided at or near each end of collective pitch control tube 102. Cyclic pitch control tube 100 and collective pitch control 102 are movable in a vertical direction parallel to longitudinal axis 50 as a unit. Thus, control tubes 102 and 100 are relatively displaceable in the angular direction and relatively fixed with respect to each other in linear displacements along longitudinal axis 50. A conventional actuator means, generally denoted by reference numeral 106, is diagramatically depicted in FIG. 2 and provides the linear motive displacing force for control tubes 100 and 102. For example, an actuator 106 is coupled by means of a lever linkage, generally denoted by reference numeral 110, to a thrust bearing diagramatically illustrated as element 112 which bears against the end of collective pitch control tube 102. Activation of actuator 108 causes thrust bearing 112 to move vertically in either direction parallel to longitudinal axis 50 thereby causing collective pitch control tube 102 and cyclic pitch control tube 100 to be displaced as a unit in the vertical direction.

As collective pitch control tube 102 and cyclic pitch control tube 100 are vertically displaced, a stationary (adjustable) swashplate 114 connected to collective pitch control tube 102 in a manner described in detail below, is also moved vertically. Stationary swashplate 114 is rotatably connected to cyclic pitch control tube 100, again in the manner described below. Stationary swashplate 114 in turn is rotatably coupled to a rotating swashplate 116 by means of bearing races 118 centered about longitudinal axis 50. Thus, rotating swashplate 116 is free to rotate about longitudinal axis 50 by means of its rotatable coupling with the stationary swashplate 114. Rotating swashplate 116 extends outwardly and downwardly to terminate in a plurality of swashplate arms 120. End 122 of arm 120 is rotatably connected to a conventional pitch link 124 which in turn is connected to a conventional pitch horn, not clearly shown in FIG. 2 since it is shown end-on, which pitch horn is connected to correspond to a pitch case 72 described above. Rotating scissors 126 are also rotatably coupled between rotating swashplate 116 and rotating hub plate 68 in a conventional manner to provide additional rigidity and linkage between rotating swashplate 116 and the rotor blade system.

Thus, as control tubes 102 and 104 are moved vertically by actuating means 106, stationary (adjustable) swashplate 114 will also move vertically by the same amount thus carrying rotating swashplate 116 with it. As rotating swashplate 116 moves vertically, pitch link 124 will be pulled upwardly as rotating swashplate 116 moves upwardly thereby exerting a displacing force on the corresponding pitch horn and causing pitch case 72 to rotate thereby altering the pitch of the corresponding rotor blade. Each of the rotor blades of the rotor system are similarly connected to rotating swashplate 116. Thus, it can be understood that the same amount of displacement and force is applied to each pitch case 72 corresponding to each rotor blade of the rotor system so that the pitch of each of the blades are changed by the same amount and in the same direction at the same time by vertical displacement of collective pitch control tube 102.

Consider now the cyclic pitch control provided by the present invention. As will be described in greater detail below, cyclic pitch control tube 100 is rotatable relative to collective pitch control tube 102. Collective pitch control tube 102 is terminated at its upper end by an outwardly extending flange 128 inclined at an angle with respect to longitudinal axis 50. The angle and inclination may be chosen according to design considerations and in general will be one half the maximum angle at which rotating swashplate 116 will be inclined at the maximum pitch control position. However, any inclination desired can be chosen. Inclined flange 128 of collective pitch control tube 102 is rotatably coupled to stationary swashplate 114 by means of a pair of bearings 130. Bearings 130 are disposed in an inclined bearing raceway 132 defined on an inner circumferential wall of stationary (adjustable) swashplate 114. The inclination of bearing raceway 132 with respect to the longitudinal axis of stationary swashplate 114 is substantially equal to the angular inclination of inclined flange 128 with respect to longitudinal axis 50. As shown in FIG. 2, when stationary swashplate 114 is rotated to a position where the inclination of bearing raceway 132 is the same as and aligned with the inclination of upper flange 128 of collective pitch control tube 102, the two inclined biases substantially cancel out leaving stationary swashplate 114 level or substantially perpendicular to longitudinal axis 50 as illustrated in FIG. 2. This would be the position of zero cyclic pitch.

Stationary swashplate 114 is coupled to cyclic pitch control tube 100 by means of a conventional universal or ball joint collectively denoted by reference numeral 134. Thus, as cyclic pitch control tube 100 is rotated with respect to collective pitch control tube 102, stationary swashplate 114 will rotate with cyclic pitch control tube 100 and tilt as permitted by universal joint 134 and as dictated by the rotatable engagement between inclined raceway 132 through bearings 130 which engages inclined flange 128.

For example, consider FIG. 3 where stationary swashplate 114 is shown in a sectional view in a position where collective pitch control tube 102 and cyclic pitch control 100 have been relatively rotated by 180° with respect to each other from that relative position illustrated in FIG. 2. Clearly, any amount of relative rotation of collective pitch control tube 102 and cyclic pitch control 100 will result in a selected degree of tilting of stationary swashplate 114 and consequently tilt of rotating swashplate 116. Thus, at a given point in the rotor blade sweep, if collective pitch control tube 102 and cyclic pitch control tube 100 are held stationary, but relatively rotated with respect to each other as shown in FIG. 3, rotating swashplate 116 will adjust the pitch of each blade at the given point to a predetermined pitch as the blade passes through that point in the rotor sweep. The angle of cyclic pitch as determined by inclination of stationary swashplate 114 can be fixed at any angle from zero as shown in the relative orientation of FIG. 2 to a maximum equal to the sum of the inclination of inclined raceway 132 and upper flange 128 when stationary swashplate 114 is rotated 180 degrees with respect to inclined upper flange 128 from that position shown in FIG. 2. The configuration of maximum inclination is illustrated in FIG. 3.

Collective pitch control tube 102 and cyclic pitch control tube 100 may be relatively rotated with respect to each other according to any number of alternative means. Two such means will be presently described. Consider now the means set forth in FIG. 4 also in diagramatic's perspective view. Collective pitch control tube 102 is shown as disposed outside of and concentric with cyclic pitch control tube 100. Collective pitch control tube 102 is maintained in a stationary angular position by means of a key 136 disposed in a slot 138 and is vertically movable therewith to permit vertical displacement of control tube 102 along longitudinal axis 50 while retaining control tube 102 in an angularly stationary position. Meanwhile, cyclic control tube 100 has a gear track 140 disposed thereon which is selectively and controllably driven by a drive gear 142 suitably controlled by conventional servo-mechanism under the pilot's control. Drive gear 142 and its associated drive mechanism would thus be mounted on a fixture connected to collective pitch control tube 102 and would ride vertically with control tubes 100 and 102 and yet would apply the selective rotary force to effectuate the angular displacement between cyclic control tube 100 and collective pitch control tube 102.

FIG. 5 shows in a bottom plan view of the control tubes another embodiment wherein collective pitch control tube 102 is held in a rotatably stationary position by the key and slot combination described in connection with FIG. 4 and wherein cyclic pitch control tube 100 is rotated relative to collective pitch control tube 102 by means of an actuator 144 connected by a link assembly, generally denoted by reference numeral 146, to a pivot pin 148 disposed through a flange 150 connected to and extending from cyclic pitch control tube 100. Actuator 144 is rotatably coupled to pivot flange 143 formed as part of collective pitch control tube 102. Extendible arm 145 is rotatably pivoted to turning lever 147 having a fulcrum pivot 149 and coupled to cyclic pitch control tube 100 by a pin and slot combination 151. Pin 148 is connected to cyclic pitch control tube 100 by a corresponding flange 153. Therefore, as actuator 144 causes link assembly, to be displaced in the directions shown by the arrows, cyclic pitch control tube 100 is rotated with respect to collective pitch control tube 102 and turning lever 147 assumes the position in the extreme as shown in dotted outline. Actuator 144 and its associated elements would, as in the case of FIG. 4, be connected to and ride with collective pitch control tube 102 as that tube is displaced in the vertical direction parallel to longitudinal axis 50.

Many alterations and modifications may be made by those having ordinary skill in the art without departing from the spirit and scope of the present invention. For example, although the means for relatively rotating cyclic pitch control tube 100 and collective pitch control tube 102 as been shown in FIGS. 4 and 5 as a means which rides with or is otherwise connected to collective pitch control tube 102, it is also possible that a direct, telescopic control linkage, mechanically connected to a pilot's control stick could be employed, as is well known in the art, for effectuating the angular relative displacement of the pitch control tube 100 and 102.

Figure 1:
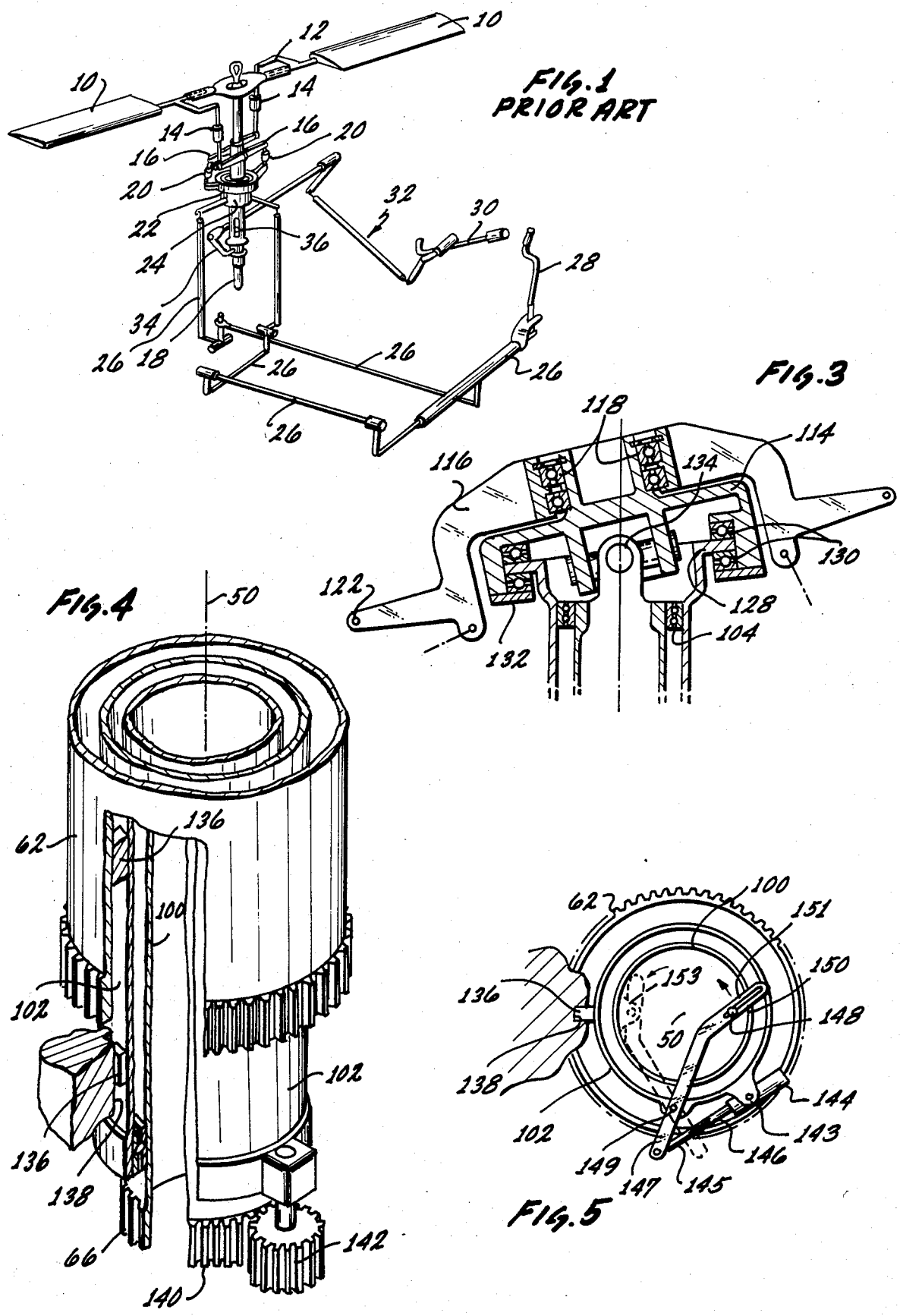
FIG. 1 is a diagramatic and simplified view of a conventional prior art control system of a helicopter shown in isolation of the other components normally included within a helicopter.

Thus, what has been described in an in-mast, pitch control system which is entirely contained within the stationary mast 52 of the helicopter thereby substantially reducing air drag and rendering the pitch control system of the helicopter more invulnerable to damage and fouling. Furthermore, pitch control of the rotor system is effected through relatively stiff control tubes as opposed to a complex assembly of linkages which is typified by the control systems to provide of the prior art as shown in FIG. 1. The stiff control tubes thus serve as a mechanical means of insulating the reactive forces exerted upon the pitch control system by the rotor blades which would otherwise be transmitted to the pilot's controls with little attenuation. In addition, due to the stiffness, there is a more positive and accurate response of the pitch control of the blades to the pilot's control inputs. The normal looseness, linkage, and bending, which is typical of prior art systems shown in FIG. 1, is substantially eliminated from the control system device as shown in the present invention. Finally, the fragileness and number of parts and connections in the pitch control system is clearly and substantially reduced by the present invention as compared with the complex linkage systems of the prior art, again typically illustrated in FIG. 1. What results is a smooth, accurate, responsive, compact, stiff, rugged, low maintenance, less vulnerable and highly reliable pitch control system over that previously known and used.

However, the present invention has been described in context of the illustrated embodiment only for the purposes of clarification and example, and the description set forth above should not be taken as limiting the invention as defined in the following claims.

We claim:

1. An apparatus for control of a rotary blade system in a helicopter having a fuselage including a plurality of controllable rotor blades comprising:

a stationary mast extending from said fuselage of said helicopter characterized by a longitudinal axis;

a collective pitch control tube disposed within said stationary mast and concentric therewith, said collective pitch control tube having an upper flange defining a first plane inclined at an angle with respect to said longitudinal axis, said collective pitch control tube longitudinally displaceable within said mast;

a cyclic pitch control tube disposed within said stationary mast;

a first swashplate coupled to said cyclic pitch control tube, said first swashplate rotatably fixed to said cyclic pitch control tube about said longitudinal axis and rotatably free with respect to said cyclic pitch control tube about all axes of rotation perpendicular to said longitudinal axis, said first swashplate also slidingly coupled to said upper flange of said collective pitch control tube through a lower flange, said lower flange being inclined with respect to said first swashplate by an angle equal to said inclination of said upper flange of said collective pitch control tube, said first swashplate and cyclic pitch control tube rotatable about said longitudinal axis with respect to said collective pitch control tube and said upper flange thereof, the inclination of said first swashplate being determined by the relative angular position of said first swashplate with respect to said inclined upper flange of said collective pitch control tube;

bearing means for providing a low friction, rotatable coupling between said first swashplate and said upper flange, said bearing means being disposed in said first swashplate in a second plane inclined with respect to said longitudinal axis;

a drive shaft disposed within said stationary mast and connected to said plurality of rotor blades for imparting rotary motion to said plurality of rotor blades when said drive shaft is rotated; and pitch linkage means for coupling said first swashplate to said plurality of rotor blades to control the pitch of said blades and wherein said pitch linkage means is coupled to said first swashplate so that inclination of said first swashplate with respect to said longitudinal axis of said mast causes the pitch of said rotor blades to be cyclically changed, and so that longitudinal displacement of said swashplate causes the pitch of said rotor blades to be collectively controlled, whereby accurate control of said rotor blades is obtained without substantial feedback of reversible control forces transmitted therethrough, whereby stiffness of said control system is increased allowing more accurate blade control, whereby the number of parts and connections are reduced for increased reliability, whereby damage vulnerability is decreased, and whereby air drag is substantially reduced due to higher compactness of said apparatus.

2. The apparatus of claim 1 wherein said stationary mast, collective pitch control tube and cyclic pitch tube are concentrically disposed about said longitudinal axis and wherein said collective pitch control tube is disposed within said stationary mast, and wherein said cyclic pitch control tube is disposed within said collective pitch control tube.

3. The apparatus of claim 2 wherein said pitch linkage means includes a rotating second swashplate rotatably coupled to said first swashplate of said cyclic pitch control tube, said second swashplate rotatable in a plane substantially parallel to a third plane defined by said first swashplate.

4. The apparatus of claim 1 wherein said collective pitch control tube and cyclic pitch control tube are relatively rotatable with respect to each other and are disposable substantially along the direction of said longitudinal axis as a collective unit to thereby impart through said pitch linkage means a collective pitch to said plurality of rotor blades.

5. The apparatus of claim 4 further comprising a gear mechanism and wherein said collective pitch control tube and cyclic pitch control tube are relatively rotatable with respect to each other by said gear mechanism, said gear mechanism being fixed with respect to said collective pitch control tube and engaging said cyclic pitch control tube to impart relative angular displacement therebetween.

6. The apparatus of claim 5 wherein said collective pitch control tube is angularly fixed with respect to said helicopter and movable with respect thereto in the direction of said longitudinal axis.

7. The apparatus of claim 4 further comprising a linkage means and wherein said collective pitch control tube is angularly rotatable with respect to said cyclic pitch control tube by said linkage means, said linkage means being fixed relative to said collective pitch control tube, said linkage means engaging said cyclic pitch control tube to rotate said cyclic pitch control tube through at least 180° rotation with respect to said collective pitch control tube.

8. The apparatus of claim 7 wherein said collective pitch control tube is rotatably fixed with respect to said helicopter and is movable in a direction parallel to said longitudinal axis.

9. An apparatus for control of a plurality of helicopter rotor blades of a helicopter including an airframe and a stationary mast extending from said airframe to said plurality of rotor blades, said stationary mast defining a longitudinal axis and having a drive shaft tube concentrically disposed about said longitudinal axis within said stationary mast and coupled to said plurality of blades for rotating said plurality of blades when said drive shaft tube rotates, said apparatus comprising:

a collective pitch control tube within said mast concentrically disposed about said longitudinal axis and having an upper inclined flange lying in a plane inclined at a predetermined angle with respect to said lontigudinal axis, said collective pitch control tube being translatable in the direction of said longitudinal axis; and a cyclic pitch control tube within said mast concentrically disposed about said longitudinal axis;

a stationary swashplate coupled to said cyclic pitch control tube said stationary swashplate having a fixed angular relative position with respect to angular displacements about said longitudinal axis, said stationary swashplate being coupled to said inclined upper flange of said collective pitch control tube and rotatable with respect thereto about said longitudinal axis;

a bearing member for slidingly engaging said inclined upper flange to said stationary swashplate, said bearing member disposed in a plane at an angle with respect to said longitudinal axis at least as great as the angle said inclined plane of said upper flange is inclined with respect to said longitudinal axis, said stationary swashplate being rotatable with respect to said upper flange about said longitudinal axis to thereby incline said stationary swashplate at an angle with respect to said longitudinal axis with a resultant angle dependent upon the relative angular displacement between said upper flange and stationary swashplate, whereby said stationary swashplate is controllably inclined with respect to said longitudinal axis; and a rotating swashplate rotatably coupled to said stationary swashplate linkage means for coupling said rotating swashplate to said plurality of rotor blades, wherein inclination of said rotating swashplate is translated into angular displacement of said rotor blades thereby varying the pitch of said rotor blades.

10. The apparatus of claim 9 wherein said collective pitch control tube and said cyclic pitch control means is movable about said longitudinal axis as a collective unit.

11. The apparatus of claim 10 wherein said collective pitch control tube is rotatably fixed relative to said airframe and movable along said longitudinal axis with respect to said airframe.

12. An improvement in a system for controlling the cyclic and collective pitch of a plurality of helicopter rotor blades of a helicopter including an airframe and a stationary mast extending from said airframe to said plurality of rotor blades, said stationary mast defining a longitudinal axis and having a drive shaft tube concentrically disposed about said longitudinal axis within said stationary mast and coupled to said plurality of rotor blades for rotating said plurality of blades, said plurality of rotor blades being coupled do a rotating swashplate through a linkage means for translating the relative angle of inclination of said rotating swashplate into cyclic pitch control of each one of said plurality of blades and for translating vertical disposition of said rotating swashplate along said longitudinal axis into collective pitch control of each of said plurality of rotor blades, said rotating swashplate rotatably coupled to an adjustable swashplate disposable at a controlled angle of inclination with respect to said longitudinal axis, said improvement comprising:

a collective pitch control tube concentrically disposed about said longitudinal axis and terminating in an upper inclined flange; and cyclic pitch control means for disposing said stationary swashplate at a selected control angle, said cyclic pitch control means comprising a cyclic pitch control tube concentrically disposed about said longitudinal axis, and a bearing member rotatably coupling said upper flange of said collective pitch control tube to said stationary swashplate, said bearing member being disposed in said stationary swashplate in an inclined raceway defining a plane with respect to said longitudinal axis, said cyclic pitch control tube coupled to said stationary swashplate for rotating said stationary swashplate relative to said upper flange of said collective pitch control tube, whereby relative rotation of said cyclic pitch control tube with respect to said collective pitch control tube causes said stationary swashplate to assume said predetermined controlled inclination through rotatable coupling of said stationary swashplate through said inclined bearing member lying in said plane with respect to said inclined flange of said collective pitch control tube.

13. The improvement of claim 12 wherein said collective pitch control tube and said cyclic pitch control tube are disposed within said stationary mast.

14. The improvement of claim 12 wherein said cyclic pitch control tube and cyclic means are movable as a collective unit in a direction substantially parallel to said longitudinal axis to effect vertical displacement of said stationary and rotating swashplates along said axis and thereby effect collective pitch control of said plurality of rotor blades.

\* \* \* \* \*